(12) United States Patent
Tomita et al.

(10) Patent No.: US 7,825,189 B2
(45) Date of Patent: Nov. 2, 2010

(54) ADHESIVE COMPOSITION FOR OPTICAL FILM, ADHESIVE SHEET, AND OPTICAL MEMBER USING SUCH ADHESIVE COMPOSITION

(75) Inventors: Koji Tomita, Sayama (JP); Takayuki Tokuyama, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 228 days.

(21) Appl. No.: 12/094,294

(22) PCT Filed: Nov. 16, 2006

(86) PCT No.: PCT/JP2006/322892
§ 371 (c)(1),
(2), (4) Date: May 20, 2008

(87) PCT Pub. No.: WO2007/058277
PCT Pub. Date: May 24, 2007

(65) Prior Publication Data
US 2009/0270557 A1 Oct. 29, 2009

(30) Foreign Application Priority Data
Nov. 21, 2005 (JP) .............. 2005-335344
Nov. 21, 2005 (JP) .............. 2005-335345

(51) Int. Cl.
*C08L 33/08* (2006.01)
(52) U.S. Cl. .......... 525/100; 526/319; 524/556
(58) Field of Classification Search ........ 524/556; 525/100; 526/319
See application file for complete search history.

(56) References Cited

U.S. PATENT DOCUMENTS 6,663,978 B1    12/2003    Olson et al.

2002/0098352 A1    7/2002    Kishioka
2003/0032715 A1*   2/2003    Sakaitani et al. ............ 524/558
2004/0152812 A1    8/2004    Yamamoto et al.

FOREIGN PATENT DOCUMENTS

| JP | 07331206 A | * | 12/1995 |
|----|------------|---|---------|
| JP | 9286080 A  |   | 11/1997 |
| JP | 2002107507 A |  | 4/2002 |
| JP | 2002173656 A |  | 6/2002 |
| JP | 2002341141 A |  | 11/2002 |
| JP | 2003013029 A |  | 1/2003 |
| JP | 2003073640 A |  | 3/2003 |
| JP | 2003193013 A |  | 7/2003 |
| JP | 2003535921 A |  | 12/2003 |
| JP | 2004190012 A |  | 7/2004 |
| JP | 2005053976 A |  | 3/2005 |

* cited by examiner

*Primary Examiner*—Michael M Bernshteyn
(74) *Attorney, Agent, or Firm*—The Webb Law Firm

(57) ABSTRACT

An adhesive composition for optical films, which inhibits contamination in the re-release process and peeling under severe conditions while favorably maintaining its durability and light leakage prevention properties. The adhesive composition includes: (A) an acrylic-based polymer which is obtained by copolymerizing at least the following monomer components: (a1) a (meth)acrylic acid alkyl ester and/or a (meth)acrylic acid alkoxyalkyl ester, (a2) an aromatic ring-containing monomer, (a3) a hydroxyl group-containing monomer, and optionally, (a4) a carboxyl group- or amino group-containing monomer, and which has a weight-average molecular weight of 800,000 to 1,600,000 and a value (Mw/Mn), as obtained by dividing the weight-average molecular weight of the copolymer by the number-average molecular weight thereof, of 10 to 50, (B) an isocyanate-based crosslinking agent, (C) a silane coupling agent, and optionally, (D) a crosslinking accelerator.

15 Claims, No Drawings

ADHESIVE COMPOSITION FOR OPTICAL FILM, ADHESIVE SHEET, AND OPTICAL MEMBER USING SUCH ADHESIVE COMPOSITION

TECHNICAL FIELD

The present invention relates to an adhesive composition, and more particularly to an adhesive composition which has excellent rework property with reconciling durability with light leakage prevention property and is advantageously used as an adhesive for optical films and the like.

BACKGROUND ART

Adhesives for optical films require durability so that foaming, lifting, peeling, etc. of optical films should not occur even in a high-temperature high-humidity atmosphere when optical members are bonded to adherends, and require light leakage prevention property so that the adhesives may flexibly follow dimensional changes of optical films in a high-temperature atmosphere so as not to cause light leakage in the case where two polarizing films that are optical films are bonded with the adhesive in such a manner that their polarization axes are at right angles to each other and allowed to stand at high temperature or at high temperature and high humidity. Further, rework property is also required in order that an optical member (member having an adhesive on an optical film) may be re-released from an adherend such as a liquid crystal panel without contaminating the adherend even in the case where the optical film is bonded to the adherend at the deviated position.

As such adhesives for optical films, acrylic-based adhesives have been mainly used in the past, and as an adhesive satisfying the above requirements, an acrylic-based adhesive obtained by blending an acrylic polymer of high-molecular weight with a medium- or low-molecular weight substance and crosslinking the resulting blend is known. In this acrylic-based adhesive, by crosslinking the acrylic polymer of high-molecular weight, cohesive force is enhanced to impart durability so as not to cause lifting and peeling, and by introducing the medium- or low-molecular weight substance, occurrence of light leakage is inhibited.

However, with recent increase of sizes of displays, light leakage attributable to dimensional changes of optical films, particularly polarizing films, in a high-temperature atmosphere becomes a more serious problem, and the adhesives for optical films have been desired to have higher flexibility. In severe conditions, further, there occurs a problem that the low-molecular weight substance added for enhancing light leakage prevention property bleeds out to contaminate the adherend in the re-release process or to cause peeling.

For example, technique to increase a ratio (Mw/Mn) of the weight-average molecular weight (Mw) to the number-average molecular weight (Mn) to not less than 4 in order to improve heat durability and stress relaxation property has been disclosed (patent document 1). However, by merely increasing the Mw/Mn ratio to not less than 4, the stress relaxation property required for large displays is insufficient.

It is also known to enhance adhesion to plastics in a high-temperature high-humidity atmosphere by using a mixture of a (meth)acrylic-based polymer having a weight-average molecular weight of not less than 200,000 and a (meth) acrylic-based polymer having a weight-average molecular weight of less than 200,000 (patent document 2). In this method, however, the component having a lower weight-average molecular weight bleeds on the surface, so that problems of contamination in the re-release process and peeling under severe working conditions could not been solved.

Further, it is also known to user as an adhesive for optical films, a polymer in which an aromatic group-containing monomer is copolymerized (patent document 3 and patent document 4). However, its object is to control the refractive index of the adhesive in order to inhibit interfacial reflection between an optical member, such as a polarizing plate or a retardation plate, and the adhesive and between the adhesive and an adherend. Since the adhesive is designed so as to exhibit strong adhesion immediately after bonding, there is a problem that the adhesive is poor in a property that re-bonding is possible even if wrong bonding is made (rework property).

Moreover, it is also known to use, as an adhesive for lowly polar films, a high-molecular weight polymer containing an alicyclic monomer or an aromatic group-containing monomer as a copolymer component (patent document 5). The adhesive, however, is designed so that the value (Mw/Mn) obtained by dividing the weight-average molecular weight of the copolymer by the number-average molecular weight thereof may become relatively small, and therefore, when the adhesive is used for a polarizing film having a large bond area or the like, there resides a problem that a stress due to dimensional change of the polarizing film or the like cannot be completely relaxed, and hence, sufficient light leakage prevention property is not obtained. Further, even if the alicyclic monomer is copolymerized, the light leakage prevention property is insufficient.

Patent document 1: Japanese Patent Laid-Open Publication No. 341141/2002
Patent document 2: Japanese Patent Laid-Open Publication No. 107507/2002
Patent document 3: Japanese Patent Laid-Open Publication No. 173656/2002
Patent document 4: Japanese Patent Laid-Open Publication No. 13029/2003
Patent document 5: Japanese Patent Laid-Open Publication No. 053976/2005

It is an object of the present invention to provide an acrylic-based adhesive composition for optical films, which not only relaxes a stress due to dimensional change of a member having a particularly large bond area, such as a polarizing film, a retardation film or an elliptically polarizing film, and prevents contamination in the re-release process and peeling or foaming under high-humidity high-temperature conditions but also inhibits color nonuniformity due to light leakage, and to provide an optical member using the adhesive composition.

SUMMARY OF THE INVENTION

The adhesive composition for optical films (first adhesive composition for optical films) of the present invention is characterized by comprising the following components (A-1), (B) and (C):

(A-1) an acrylic-based polymer obtained by copolymerizing at least the following monomer components (a1), (a2), (a3) and (a4) and having a weight-average molecular weight of 800,000 to 1,600,000 and a value (Mw/Mn), as obtained by dividing the weight-average molecular weight of the copolymer by the number-average molecular weight thereof, of 10 to 50, (a1) a (meth)acrylic acid alkyl ester and/or a (meth)acrylic acid alkoxyalkyl ester in an amount of 4.5 to 89% by weight, (a2) an aromatic ring-containing monomer in an amount of 10 to 85% by weight, (a3) a hydroxyl group-containing monomer in an amount of 0.5 to 10% by weight, and (a4) a carboxyl group- or amino group-containing monomer in an amount of 0.05 to 0.5% by weight, (B) an isocyanate-based crosslinking agent in an amount of 0.005 to 5 parts by weight based on 100 parts by weight of the acrylic-based polymer, and (C) a silane coupling agent in an amount of 0.05 to 1.0 part by weight based on 100 parts by weight of the acrylic-based polymer.

(A-2) an acrylic-based polymer obtained by copolymerizing at least the following components (a1), (a2) and (a3) and having a weight-average molecular weight of 800,000 to 1,600,000 and a value (Mw/Mn), as obtained by dividing the weight-average molecular weight of the copolymer by the number-average molecular weight thereof, of 10 to 50, (a1) a (meth)acrylic acid alkyl ester and/or a (meth)acrylic acid alkoxyalkyl ester in an amount of 5 to 89.5% by weight, (a2) an aromatic ring-containing monomer in an amount of 10 to 85% by weight, and (a3) a hydroxyl group-containing monomer in an amount of 0.5 to 10% by weight, (B) an isocyanate-based crosslinking agent in an amount of 0.005 to 5 parts by weight based on 100 parts by weight of the acrylic-based polymer, (C) a silane coupling agent in an amount of 0.05 to 1.0 part by weight based on 100 parts by weight of the acrylic-based polymer, and (D) a crosslinking accelerator in an amount of 0.001 to 0.5 part by weight based on 100 parts by weight of the acrylic-based polymer.

The adhesive composition for optical films (second adhesive composition for optical films) of the present invention is characterized by comprising the following components (A-2), (B), (C) and (D):

(A-2) an acrylic-based polymer obtained by copolymerizing at least the following components (a1), (a2) and (a3) and having a weight-average molecular weight of 800,000 to 1,600,000 and a value (Mw/Mn), as obtained by dividing the weight-average molecular weight of the copolymer by the number-average molecular weight thereof, of 10 to 50, (a1) a (meth)acrylic acid alkyl ester and/or a (meth)acrylic acid alkoxyalkyl ester in an amount of 5 to 89.5% by weight, (a2) an aromatic ring-containing monomer in an amount of 10 to 85% by weight, and (a3) a hydroxyl group-containing monomer in an amount of 0.5 to 10% by weight, (B) an isocyanate-based crosslinking agent in an amount of 0.005 to 5 parts by weight based on 100 parts by mass of the acrylic-based polymer, (C) a silane coupling agent in an amount of 0.05 to 1.0 part by weight based on 100 parts by mass of the acrylic-based polymer, and (D) a crosslinking accelerator in an amount of 0.001 to 0.5 part by weight based on 100 parts by mass of the acrylic-based polymer.

That is to say, the present inventors have found that the aforesaid problems can be solved by selecting and using a specific (meth)acrylic-based polymer containing an aromatic group-containing monomer as a copolymer component and having a weight-average molecular weight of 800,000 to 1,600,000 and a value (Mw/Mn), as obtained by dividing the weight-average molecular weight of the copolymer by the number-average molecular weight thereof, of 10 to 50, and they have reached the present invention.

The present invention further provides an adhesive sheet having, on at least one surface of a substrate, an adhesive layer obtained from the above adhesive composition.

The present invention furthermore provides an optical member having, on at least one surface of an optical film, an adhesive layer obtained from the above adhesive composition.

According to the present invention, an adhesive composition which is free from bleeding of a low-molecular weight component, can inhibit contamination in the re-release process and peeling under severe conditions and is excellent also in rework property with reconciling durability with light leakage prevention property can be provided.

The optical member wherein an adhesive layer composed of the adhesive for optical members of the invention is formed on a polarizing film, a retardation film or an elliptically polarizing film is free from occurrence of light leakage or the like when the optical member is bonded to a glass substrate or the like because the adhesive layer sufficiently relaxes thermal stress.

BEST MODE FOR CARRYING OUT THE INVENTION

The first adhesive composition for optical films of the invention comprises an acrylic-based polymer (component (A-1)), a crosslinking agent (component (B)) and a silane coupling agent (component (C)).

The second adhesive composition for optical films of the invention comprises an acrylic-based polymer (component (A-2)), a crosslinking agent (component (B)), a silane coupling agent (component (C)) and a crosslinking accelerator (component (D)).

The (meth)acrylic acid alkyl ester and the (meth)acrylic acid alkoxyalkyl ester (component (a1)) that is one copolymer component to constitute the component (A-1) or (A-2) that is the acrylic-based polymer is a (meth)acrylic acid ester having a chain alkyl group and having no aromatic ring in its structure.

Preferred examples of the (meth)acrylic acid alkyl esters include those having an alkyl group of 1 to 12 carbon atoms which may be branched. Specifically, there can be mentioned methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, dodecyl (meth)acrylate and lauryl (meth)acrylate. The (meth)acrylic acid means both of acrylic acid and methacrylic acid, and the (meth)acrylate means both of acrylate and methacrylate.

Preferred examples of the (meth)acrylic acid alkoxyalkyl esters include methoxyethyl (meth)acrylate and ethoxyethyl (meth)acrylate.

The aromatic ring-containing monomer (component (a2)) that is another essential copolymer component of the component (A-1) or (A-2) is a copolymerizable compound containing an aromatic group in its structure. Examples of the aromatic ring-containing monomers that are the components (a2) of the monomer mixture include phenyl acrylate, phenoxyethyl (meth)acrylate, benzyl (meth)acrylate, phenoxydiethylene glycol (meth)acrylate, ethylene oxide-modified nonylphenol (meth)acrylate, hydroxyethylated β-naphthol acrylate, biphenyl (meth)acrylate, styrene, vinyltoluene and α-methylstyrene.

The monomer having a hydroxyl group in the molecule (component (a3)) is another essential copolymer component of the component (A-1) or (A-2), and examples thereof include 2-hydroxyethyl(meth)acrylate, 4-hydroxybutyl (meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, chloro-2-hydroxypropyl acrylate, diethylene glycol mono(meth)acrylate and allyl alcohol.

Examples of the monomers having a carboxyl group in the molecule, which are the components (a4) used in the component (A-1), include (meth)acrylic acid, 2-carboxylethyl (meth)acrylate, 3-carboxylpropyl (meth)acrylate, 4-carboxylbutyl (meth)acrylate, itaconic acid, crotonic acid, maleic acid, fumaric acid and maleic anhydride. Examples of the amino group-containing monomers include aminoethyl (meth)acrylate, dimethylaminoethyl (meth)acrylate, dimethylaminopropyl (meth)acrylate and vinylpyridine.

In the monomer mixture that is the component (A-1) of the first adhesive composition for optical films of the invention, the amount of the (meth)acrylic acid alkyl ester and/or the (meth)acrylic acid alkoxyalkyl ester that is the component (a1) is in the range of 4.5 to 89% by weight, the amount of the aromatic ring-containing monomer (a2) is in the range of 10 to 85% by weight, the amount of the component (a3) is in the range of 1 to 10% by weight, and the amount of the component (a4) is in the range of 0.05 to 0.5% by weight. It is preferable that the amount of the component (a1) is in the range of 22.7 to 69% by weight, the amount of the aromatic ring-containing monomer (a2) is in the range of 30 to 70% by weight, the amount of the component (a3) is in the range of 1 to 7% by weight, and the amount of the component (a4) is in the range of 0.05 to 0.3% by weight.

In the monomer mixture that is the component (A-2) of the second adhesive composition for optical films of the invention, the amount of the (meth)acrylic acid alkyl ester and/or the (meth)acrylic acid alkoxyalkyl ester that is the component (a1) is in the range of 5 to 89.5% by weight, the amount of the aromatic ring-containing monomer (a2) is in the range of 10 to 85% by weight, and the amount of the component (a3) is in the range of 1 to 10% by weight. It is preferable that the amount of the component (a1) is in the range of 23 to 69% by weight, the amount of the aromatic ring-containing monomer (a2) is in the range of 30 to 70% by weight, and the amount of the component (a3) is in the range of 1 to 7% by weight.

If the amount of the aromatic ring-containing monomer that is the component (a2) is so small as to deviate from the above range, light leakage cannot be sufficiently prevented occasionally, and if the amount thereof is so large as to deviate from the above range, rework property is sometimes deteriorated. If the amount of the component (a3) is so small as to deviate from the above range, durability level is sometimes lowered, and if the amount thereof is too large, durability and light leakage prevention property are not well balanced with each other. If the amount of the component (a4) in the component (A-1) is so small as to deviate the above range, a long aging time is sometimes necessary, and peeling or foaming sometimes occurs under high-temperature conditions or high-humidity high-temperature conditions. If the amount of the component (a4) is so large as to deviate from the above range, over-aging occurs, and in the case of a large bond area, light leakage prevention property sometimes becomes insufficient.

The monomer mixture may be mixed with other monomers, when necessary. Examples of other monomers include epoxy group-containing (meth)acrylates, such as glycidyl (meth)acrylate; acetoacetyl group-containing (meth)acrylates, such as acetoacetoxyethyl (meth)acrylate; vinyl acetate; vinyl chloride; and (meth)acrylonitrile. Other monomers can be contained in a mixing ratio of 0 to 10% by weight.

The acrylic-based polymer used in the adhesive for optical members of the invention can be produced by polymerization processes hitherto publicly known, such as solution polymerization, bulk polymerization, emulsion polymerization and suspension polymerization. However, an acrylic-based polymer produced by solution polymerization or bulk polymerization containing no polymerization stabilizer such as an emulsifying agent or a suspension agent is preferable. The weight-average molecular weight (Mw) of the acrylic-based polymer, as determined by gel permeation chromatography (GPC), is in the range of 800,000 to 1,600,000, preferably 800,000 to 1,500,000. If Mw is less than 800,000, cohesive force of the adhesive is not sufficient in the heating process and foaming is liable to occur under high-temperature conditions, even if the amount of the curing agent added is adjusted to a preferred range. If Mw exceeds 1,600,000, stress relaxation property of the adhesive is lowered, and for example, when the adhesive is used for bonding a glass substrate and a polarizing plate together, light leakage phenomenon is liable to occur at the peripheral edge portion of the bond area.

Further, the ratio (Mw/Mn) of the weight-average molecular weight of the acrylic-based polymer to the number-average molecular weight (Mn) thereof needs to be in the range of 10 to 50, and the acrylic-based polymer has a wide molecular weight distribution and a low tensile modulus. Owing to this low tensile modulus, excellent stress relaxation property is exerted, and display nonuniformity is effectively prevented. From this viewpoint, the above ratio (Mw/Mn) is more preferably in the range of 20 to 50. Since the above ratio (Mw/Mn) is in the proper range and a proper amount of the aromatic ring-containing monomer is copolymerized in the invention, light leakage prevention property is remarkably improved by the synergistic effect. The reason is presumed to be that widening of the molecular weight distribution and copolymerization of the aromatic ring-containing monomer improve stress relaxation of a film at the time of heat shrinkage, and in addition, lowering of birefringence of the adhesive layer due to copolymerization of the aromatic ring-containing monomer markedly improves light leakage prevention property. However, if the above ratio (Mw/Mn) becomes too high, the low-molecular weight polymer is increased, and foaming is liable to occur. On the other hand, if the above ratio (Mw/Mn) becomes too low, stress relaxation property is lowered, and in the case of a large bond area, light leakage is liable to occur.

The first adhesive composition for optical films of the invention comprises 100 parts by weight of the acrylic-based polymer that is the component (A-1), 0.005 to 5 parts by weight of the isocyanate compound that is the component (B) and 0.05 to 1.0 part by weight of the silane coupling agent that is the component (C).

The second adhesive composition for optical films of the invention comprises 100 parts by weight of the acrylic-based polymer that is the component (A-2), 0.005 to 5 parts by weight of the isocyanate compound that is the component (B), 0.05 to 1.0 part by weight of the silane coupling agent that is the component (C) and the crosslinking accelerator that is the component (D).

Examples of the isocyanate compounds that are the components (B) employable in the adhesive composition for optical films of the invention include isocyanate monomers, such as tolylene diisocyanate, chlorophenylene diisocyanate, hexamethylene diisocyanate, tetramethylene diisocyanate, isophorone diisocyanate, xylylene diisocyanate, diphenylmethane diisocyanate and hydrogenated diphenylmethane diisocyanate; isocyanate compounds obtained by addition reaction of the above isocyanate monomers with trimethylolpropane or the like; isocyanurate compounds; burette type compounds; and urethane prepolymer type isocyanates obtained by addition reaction with polyether polyol, polyester polyol, acrylic polyol, polybutadiene polyol, polyisoprene polyol and the like.

In order to rapidly form a crosslinked structure due to such an isocyanate compound, the first adhesive composition for optical films of the invention uses the component (a4) as an essential component, and the second adhesive composition for optical films of the invention uses the component (D) as an essential component. Since the aromatic ring-containing monomer copolymerized as an essential component in the invention is bulky, a progress of the crosslinking reaction can be accelerated by allowing a crosslinking reaction accelerating catalyst such as a carboxyl group or an amino group to be present in the polymer or by using a crosslinking accelerator. In the first adhesive composition for optical films, the crosslinking accelerator can be used.

Examples of the crosslinking accelerators that are the components (D) include amino compounds, such as N,N,N',N'-tetramethylhexanediamine, triethylamine and imidazole; and organometallic compounds, such as cobalt naphthenate, dibutyltin diacetate, dibutyltin diacetylacetonate, tetra-n-butyltin, trimethyltin hydroxide and dibutyltin dilaurate. One or more kinds of these compounds are preferably used. When such a crosslinking agent is used, the amount of the crosslinking agent used is in the range of usually 0.001 to 0.5 part by weight, preferably 0.001 to 0.3 part by weight, based on 100 parts by weight of the acrylic-based polymer.

If the amount of the crosslinking agent in the second adhesive composition for optical films of the invention is so small as to deviate the above range, a long aging time is sometimes necessary, and peeling or foaming sometimes occurs under high-temperature conditions or high-humidity high-temperature conditions. If the amount of the crosslinking agent is so large as to deviate from the above range, over-aging occurs, and in the case of a large bond area, light leakage prevention property sometimes becomes insufficient. Further, the crosslinking agent sometimes bleeds out to cause contamination in the re-release process.

Examples of the silane coupling agents employable in the adhesive composition for optical films of the invention include polymerizable unsaturated group-containing silicon compounds, such as vinyltrimethoxysilane, vinyltriethoxysilane and methacryloxypropyltrimethoxysilane; silicon compounds having an epoxy structure, such as 3-glycidoxypropyltrimethoxysilane, 3-glycidoxypropylmethyldimethoxysilane and 2-(3,4-epoxycyclohexyl)ethyltrimethoxysilane; amino group-containing silicon compounds, such as 3-aminopropyltrimethoxysilane, N-(2-aminoethyl)-3-aminopropyltrimethoxysilane and N-(2-aminoethyl)-3-aminopropylmethyldimethoxysilane; and 3-chloropropyltrimethoxysilane.

The component (C) is particularly preferably a compound having an isocyanate group, a carboxyl group or an alkoxy group.

When the component (C) is used, the amount of the compound (C) is desired to be in the range of 0.05 to 1.0 part by weight, preferably 0.05 to 0.6 part by weight, based on 100 parts by weight of the component (A). If the amount of the silane coupling agent is too small, an effect of preventing peeling cannot be exerted, and if the amount thereof is too large, the silane coupling agent sometimes bleeds out to cause peeling or foaming.

In the case where the acrylic-based polymer is produced by solution polymerization, mixing of the acrylic-based polymer, the isocyanate compound and the silane coupling agent is carried out by adding the isocyanate compound and the silane coupling agent to an acrylic-based polymer solution obtained after completion of polymerization. In the case where the acrylic-based polymer is produced by bulk polymerization, mixing of these components is preferably carried out in the course of polymerization of the acrylic-based polymer because homogeneous mixing becomes difficult after completion of polymerization.

To the adhesive composition for optical films of the invention, an antioxidant, an ultraviolet light absorber, a tackifier, a plasticizer and the like may be added within limits not detrimental to the effect of the invention. The adhesive sheet for optical members of the invention is a sheet wherein an adhesive layer composed of the above-described adhesive composition for optical films is provided on one or both surfaces of a substrate. The adhesive layer is provided by a hitherto publicly known method.

The optical member of the invention is an optical member wherein an adhesive layer composed of the above-described adhesive composition for optical films is provided on at least one surface of an optical film. Examples of the optical films include a polarizing film, a retardation film, an elliptically polarizing film, an antireflection film, a luminance enhancing film, a light diffusing film, and a glass scattering-preventive surface-protective film. Especially when the substrate is a polarizing film, a retardation film or an elliptically polarizing film, stress relaxation property of the adhesive for optical films can be exhibited more effectively.

EXAMPLES

The present invention is further described with reference to the following examples, but it should be construed that the invention is in no way limited to those examples.

Preparation Examples 1 to 3, 7 to 21, 25 to 28, 31, 34 to 36, 40 to 48, 52, 53, and 56

In a reaction device equipped with a stirrer, a reflux condenser, a thermometer and a nitrogen feed pipe, copolymerizable monomers and ethyl acetate in amounts (part(s) by weight, sometimes referred to as "part(s)" in the following examples and tables) shown in Table 1 were placed, then 0.2 part of azobisisobutyronitrile (available from Otsuka Chemical Co., Ltd., abbreviated to "AIBN" hereinafter) was added, and air in the reaction vessel was replaced with a nitrogen gas. Subsequently, with stirring in an atmosphere of nitrogen, the temperature was raised to 60° C., followed by performing reaction for 1.5 hours. Thereafter, with dropwise adding 50 parts of ethyl acetate over a period of 50 minutes, 0.2 part of perhexyl PV (available from Nippon Oil & Fats Co., Ltd., abbreviated to "PHPV" hereinafter) that was a peroxide-based polymerization initiator was added after the lapse of 30 minutes from the beginning of dropwise addition, and the temperature was raised up to 80° C., followed by performing reaction for 20 minutes. Subsequently, 0.3 part of PHPV was added, and reaction was performed for 40 minutes. Then, 1.0 part of PHPV was further added, and reaction was performed for 3 hours. After the reaction was completed, the reaction solution was diluted with ethyl acetate to obtain a (meth) acrylic-based polymer solution.

Preparation Example 4

A (meth)acrylic-based polymer solution was obtained in the same manner as in Preparation Example 1, except that the amount of ethyl acetate dropwise added was changed to 65 parts from 50 parts.

Preparation Example 5

A (meth)acrylic-based polymer solution was obtained in the same manner as in Preparation Example 1, except that the amount of ethyl acetate dropwise added was changed to 80 parts from 50 parts.

Preparation Example 6

A (meth)acrylic-based polymer solution was obtained in the same manner as in Preparation Example 1, except that the amount of ethyl acetate dropwise added was changed to 95 parts from 50 parts.

Preparation Example 22

A (meth)acrylic-based polymer solution was obtained in the same manner as in Preparation Example 1, except that the amount of ethyl acetate dropwise added was changed to 110 parts from 50 parts.

Preparation Examples 23 and 24

A (meth)acrylic-based polymer solution was obtained in the same manner as in Preparation Example 1, except that the amount of ethyl acetate dropwise added was changed to 20 parts from 50 parts.

Preparation Example 29

In a reaction device equipped with a stirrer, a reflux condenser, a thermometer and a nitrogen feed pipe, copolymerizable monomers and ethyl acetate and toluene shown in Table 1 were placed, then 0.1 part of AIBN was added, and air in the reaction vessel was replaced with a nitrogen gas. Subsequently, with stirring in an atmosphere of nitrogen, the temperature was raised to 68° C., followed by performing reaction for 8 hours. After the reaction was completed, the reaction solution was diluted with ethyl acetate to obtain a (meth)acrylic-based polymer solution.

Preparation of Example 33

In a reaction device equipped with a stirrer, a reflux condenser, a thermometer and a nitrogen feed pipe, copolymerizable monomers and ethyl acetate shown in Table 1 were placed, then 0.1 part of AIBN was added, and air in the reaction vessel was replaced with a nitrogen gas. Subsequently, with stirring in an atmosphere of nitrogen, the temperature was raised to 68° C., followed by performing reaction for 8 hours. After the reaction was completed, the reaction solution was diluted with ethyl acetate to obtain a (meth)acrylic-based polymer solution.

Preparation Example 30

In a reaction device equipped with a stirrer, a reflux condenser, a thermometer and a nitrogen feed pipe, copolymerizable monomers, ethyl acetate and toluene in amounts (part(s) by weight) shown in Table 1 were placed, then 0.2 part of AIBN was added, and air in the reaction vessel was replaced with a nitrogen gas. Subsequently, with stirring in an atmosphere of nitrogen, the temperature was raised to 70° C., followed by performing reaction for 2 hours. Thereafter, 0.2 part of PHPV that was a peroxide-based polymerization initiator was added, and the temperature was raised up to 80° C., followed by performing reaction for 20 minutes. Subsequently, 0.3 part of PHPV was added, and reaction was performed for 40 minutes. Then, 1.0 part of PHPV was further added, and reaction was performed for 3 hours. After the reaction was completed, the reaction solution was diluted with ethyl acetate to obtain a (meth)acrylic-based polymer solution.

Preparation Example 32

In a reaction device equipped with a stirrer, a reflux condenser, a thermometer and a nitrogen feed pipe, copolymerizable monomers and ethyl acetate in amounts (part(s) by weight) shown in Table 1 were placed, then 0.2 part of AIBN was added, and air in the reaction vessel was replaced with a nitrogen gas. Subsequently, with stirring in an atmosphere of nitrogen, the temperature was raised to 60° C., followed by performing reaction for 3 hours. Thereafter, with dropwise adding 20 parts of ethyl acetate over a period of 50 minutes, 0.2 part of PHPV was added, and the temperature was raised up to 80° C., followed by performing reaction for 5 hours. After the reaction was completed, the reaction solution was diluted with ethyl acetate to obtain a (meth)acrylic-based polymer solution.

Preparation Example 37

A (meth)acrylic-based polymer solution was obtained in the same manner as in Preparation Example 1, except that the amount of ethyl acetate dropwise added was changed to 65 parts from 50 parts.

Preparation Example 38

A (meth)acrylic-based polymer solution was obtained in the same manner as in Preparation Example 1, except that the amount of ethyl acetate dropwise added was changed to 80 parts from 50 parts.

Preparation Example 39

A (meth)acrylic-based polymer solution was obtained in the same manner as in Preparation Example 1, except that the amount of ethyl acetate dropwise added was changed to 95 parts from 50 parts.

Preparation Example 49

A (meth)acrylic-based polymer solution was obtained in the same manner as in Preparation Example 1, except that the amount of ethyl acetate dropwise added was changed to 110 parts from 50 parts.

Preparation Examples 50 and 51

A (meth)acrylic-based polymer solution was obtained in the same manner as in Preparation Example 1, except that the amount of ethyl acetate dropwise added was changed to 20 parts from 50 parts.

Preparation Example 54

In a reaction device equipped with a stirrer, a reflux condenser, a thermometer and a nitrogen feed pipe, copolymerizable monomers and ethyl acetate shown in Table 1 were placed, then 0.1 part of AIBN was added, and air in the reaction vessel was replaced with a nitrogen gas. Subsequently, with stirring in an atmosphere of nitrogen, the temperature was raised to 68° C., followed by performing reaction for 8 hours. After the reaction was completed, the reaction solution was diluted with ethyl acetate to obtain a (meth)acrylic-based polymer solution.

Preparation Example 55

In a reaction device equipped with a stirrer, a reflux condenser, a thermometer and a nitrogen feed pipe, copolymerizable monomers and ethyl acetate and toluene shown in Table 1 were placed, then 0.1 part of AIBN was added, and air in the reaction vessel was replaced with a nitrogen gas. Subsequently, with stirring in an atmosphere of nitrogen, the temperature was raised to 68° C., followed by performing reaction for 8 hours. After the reaction was completed, the reaction solution was diluted with ethyl acetate to obtain a (meth)acrylic-based polymer solution.

Preparation Example 57

In a reaction device equipped with a stirrer, a reflux condenser, a thermometer and a nitrogen feed pipe, copolymerizable monomers and ethyl acetate in amounts (part(s) by weight) shown in Table 1 were placed, then 0.2 part of AIBN was added, and air in the reaction vessel was replaced with a nitrogen gas. Subsequently, with stirring in an atmosphere of nitrogen, the temperature was raised to 60° C., followed by performing reaction for 3 hours. Thereafter, with dropwise adding 20 parts of ethyl acetate over a period of 50 minutes, 0.2 part of PHPV was added, followed by performing reaction for 5 hours. After the reaction was completed, the reaction solution was diluted with ethyl acetate to obtain a (meth)acrylic-based polymer solution.

Weight-average molecular weights (Mw) obtained by GPC measurements of the (meth)acrylic-based polymers prepared in Preparation Examples of 1 to 57 and numerical values (Mw/Mn) obtained by dividing the weight-average molecular weights of the copolymers by the number-average molecular weights thereof, respectively, are set forth in Table 1.

GPC Measurement Conditions

Measuring device: HLC-8120GPC (manufactured by Tosoh Corporation)

GPC column constitution: 5 continuous columns described bellow (all available from Tosoh Corporation)
(1) TSK-GEL $H_{XL}$-H (Guard Column)
(2) TSK-GEL G7000HXL
(3) TSK-GEL GMHXL
(4) TSK-GEL GMHL
(5) TSK-GEL G2500HXL Sample concentration: The polymer solution was diluted with tetrahydrofuran so that the sample concentration would become 1.0 mg/cm$^3$.

Mobile phase solvent: tetrahydrofuran
Flow rate: 1.0 cm$^3$/min
Column temperature: 40° C.

Example 1

To 100 parts of the (meth)acrylic-based polymer (solids content) in the (meth)acrylic-based polymer solution obtained in Preparation Example 1, 0.2 part of an isocyanate-based crosslinking agent TD-75 (available from Soken Chemical & Engineering Co., Ltd.) and 0.1 part of a silane coupling agent KBE-9007 (available from Shin-Etsu Chemical Co., Ltd.) were added, to obtain a solution of an adhesive composition.

The solution of an adhesive composition was applied to a surface of a polyester film having been subjected to release treatment, and then dried to obtain an adhesive sheet having an adhesive layer of 25 µm thickness. This adhesive sheet was bonded to one surface of a polarizing film and aged for 7 days under the conditions of a temperature of 23° C. and a humidity of 65% RH to obtain an optical member.

Examples 2 to 25, Comparative Examples 1 to 14

In the same manner as in Example 1, to 100 parts of the (meth)acrylic-based polymer (solids content) in the polymer solution of each of Preparation Examples 2 to 32, an isocyanate-based crosslinking agent, a silane coupling agent and a crosslinking accelerator were added as shown in Table 2, to obtain a solution of an adhesive composition.

Using the resulting adhesive composition, an optical member was obtained in the same manner as in Example 1.

The optical members obtained in the examples and the comparative examples were evaluated on durability, rework property and light leakage prevention property by the following evaluation methods. The results are set forth in Table 2.

Evaluation Method for Durability

The optical member was cut into a given size, bonded to one surface of a non-alkali glass plate using a laminator roll and then held for 20 minutes in an autoclave adjusted to 50° C. and 5 atm, to prepare a test plate.

Two test plates similar to that described above were prepared, then they were allowed to stand under the conditions of a temperature of 60° C. and a humidity of 95% RH for 500 hours and under the conditions of a temperature of 85° C. for 500 hours, respectively, and they were visually observed on occurrence of foaming, peeling, cracking and the like and evaluated by the following criteria.

AA: Bad appearance, such as foaming, peeling or cracking, was not found.

BB: Bad appearance, such as foaming, peeling or cracking, was slightly found.

CC: Bad appearance, such as foaming, peeling or cracking, was obviously found.

Evaluation Method for Heat Cycle Durability

The optical member was bonded to one surface of a non-alkali glass plate using a laminator roll and then held for 20 minutes in an autoclave adjusted to 50° C. and 5 atm, to prepare a test plate. Heat cycle (one cycle: −40° C. for 30 minutes and 80° C. for 30 minutes) of the test plate thus prepared was repeated 200 times using a thermal impact device TSA-71L-A manufactured by Espec Corp. Then, the optical member was visually observed on occurrence of foaming, lifting and peeling and evaluated by the following criteria.

AA: Bad appearance, such as foaming, lifting or pealing, was not found.

BB: Bad appearance, such as foaming, lifting or pealing, was slightly found.

CC: Foaming, lifting and pealing were confirmed.

Rework Property Test

After the optical member was cut into a width of 25 mm, the polyester release film was peeled, and the polarizing film was bonded to a glass plate through the adhesive film. This was held for 20 minutes in an autoclave adjusted to a temperature of 50° C. and a pressure of 5 atm, and the polarizing film and the glass plate were bonded to obtain a test specimen.

The test specimen was allowed to stand still for 6 hours at a temperature of 70° C. and then allowed to cool down to 23° C. Thereafter, the optical member was peeled from the glass plate at a peel angle of 180 degrees, and the surface of the glass plate was visually observed.

AA: Contamination of the glass plate surface and remaining of the adhesive on the glass plate surface were not found.

BB: Contamination of the glass plate surface and remaining of the adhesive on the glass plate surface were slightly found.

CC: Contamination of the glass plate surface and remaining of the adhesive on the glass plate surface were obviously found.

Evaluation Method for Light Leakage Prevention Property

Using a laminator roll, two of the optical members were bonded to a front surface and a back surface of a non-alkali glass plate, respectively, so as to become in a state of crossed Nicols, and then, they were held for 20 minutes in an autoclave adjusted to 50° C. and 5 atm, to prepare a test plate.

The test plate thus prepared was allowed to stand for 500 hours under the conditions of 85° C., and the test plate was visually observed on light leakage prevention property and evaluated by the following criteria.

AA: Light leakage was not found at all.

BB: Light leakage was rarely found.

CC: Light leakage was slightly found.

DD: Obvious light leakage was found.

TABLE 1

| Preparation Example | Monomer | | | | | | | | | | | | Reaction solvent | | Molecular weight | |
|---|---|---|---|---|---|---|---|---|---|---|---|---|---|---|---|---|
| | Component a | | | Component b | | | | Component c | | Component d | | | Ethyl acetate | Toluene | Mw | Mw/Mn |
| | BA | 2EHA | MEA | BZA | PHEA | PDEGA | PHA | 2HEA | 4HBA | AA | MAA | DM | | | | |
| 1 | 86.3 | — | — | 10 | — | — | — | 3.5 | — | 0.2 | — | — | 125 | — | 9,500,000 | 28 |
| 2 | 76.3 | — | — | 20 | — | — | — | 3.5 | — | 0.2 | — | — | 115 | — | 1,000,000 | 30 |
| 3 | 61.3 | — | — | 35 | — | — | — | 3.5 | — | 0.2 | — | — | 95 | — | 1,050,000 | 34 |
| 4 | 46.3 | — | — | 50 | — | — | — | 3.5 | — | 0.2 | — | — | 85 | — | 1,250,000 | 43 |
| 5 | 11.3 | 20 | — | 70 | — | — | — | 3.5 | — | 0.2 | — | — | 70 | — | 1,080,000 | 32 |
| 6 | 16.3 | — | — | 80 | — | — | — | 3.5 | — | 0.2 | — | — | 60 | — | 1,100,000 | 34 |
| 7 | 41.3 | — | 20 | 35 | — | — | — | 3.5 | — | 0.2 | — | — | 90 | — | 1,150,000 | 36 |
| 8 | 59.8 | — | — | 35 | — | — | — | 5 | — | 0.2 | — | — | 95 | — | 1,050,000 | 35 |
| 9 | 62.7 | — | — | 30 | — | — | — | 7 | — | 0.2 | — | — | 95 | — | 1,100,000 | 33 |
| 10 | 59.7 | — | — | 30 | — | — | — | 10 | — | 0.2 | — | — | 100 | — | 1,170,000 | 39 |
| 11 | 66.5 | — | — | 30 | — | — | — | 3.5 | — | 0.05 | — | — | 95 | — | 1,120,000 | 35 |
| 12 | 58.8 | — | — | — | 40 | — | — | — | 1 | 0.2 | — | — | 120 | — | 1,150,000 | 36 |
| 13 | 59.3 | — | — | — | — | 50 | — | — | 0.5 | 0.2 | — | — | 120 | — | 1,010,000 | 29 |
| 14 | 61.3 | — | — | 35 | — | — | — | 3.5 | — | — | 0.2 | — | 95 | — | 1,200,000 | 39 |
| 15 | 60.3 | — | — | 35 | — | — | — | 4.5 | — | 0.1 | 0.1 | — | 95 | — | 1,240,000 | 43 |
| 16 | 41.3 | — | 20 | 35 | — | — | — | 3.5 | — | 0.2 | — | — | 65 | — | 1,500,000 | 50 |
| 17 | 43.8 | — | 20 | 35 | — | — | — | — | 1 | 0.2 | — | — | 85 | — | 1,110,000 | 35 |
| 18 | 61.8 | — | — | — | 30 | — | 10 | 3.5 | — | 0.2 | — | — | 140 | — | 800,000 | 20 |
| 19 | 59.4 | — | — | 19 | 18 | — | — | 3.5 | — | 0.1 | — | — | 100 | — | 1,170,000 | 39 |
| 20 | 41.3 | — | 20 | 35 | — | — | — | 3.5 | — | 0.5 | — | — | 85 | — | 1,200,000 | 32 |
| 21 | 41.3 | — | 20 | 35 | — | — | — | 3.5 | — | — | — | 0.2 | 95 | — | 1,100,000 | 34 |
| 22 | 6.3 | — | — | 90 | — | — | — | 3.5 | — | 0.2 | — | — | 60 | — | 1,050,000 | 32 |
| 23 | 88.3 | — | — | 8 | — | — | — | 3.5 | — | 0.2 | — | — | 130 | — | 1,250,000 | 41 |
| 24 | 96.3 | — | — | — | — | — | — | 3.5 | 1 | 0.2 | — | — | 130 | — | 1,200,000 | 37 |
| 25 | 69.5 | — | — | 30 | — | — | — | 0.3 | — | 0.2 | — | — | 85 | — | 1,140,000 | 37 |
| 26 | 57.7 | — | — | 30 | — | — | — | 12 | — | 0.2 | — | — | 100 | — | 1,300,000 | 38 |
| 27 | 66.5 | — | — | 30 | — | — | — | 3.5 | — | — | — | — | 90 | — | 1,100,000 | 32 |
| 28 | 66 | — | — | 30 | — | — | — | 3.5 | — | 0.7 | — | — | 90 | — | 1,120,000 | 33 |
| 29 | 61.3 | — | — | 35 | — | — | — | 3.5 | — | 0.2 | — | — | 130 | 30 | 900,000 | 7 |
| 30 | 61.3 | — | — | 35 | — | — | — | 3.5 | — | 0.2 | — | — | 100 | 30 | 700,000 | 14 |
| 31 | 61.3 | — | — | 35 | — | — | — | — | 1 | 0.2 | — | — | 60 | — | 1,540,000 | 55 |
| 32 | 88.3 | — | — | 10 | — | — | — | 2 | — | 0.2 | — | — | 70 | — | 1,700,000 | 12 |
| 33 | 78 | — | — | — | 20 | — | — | 3.5 | — | — | — | — | 180 | — | 1,000,000 | 9 |
| 34 | 86.3 | — | — | 10 | — | — | — | 3.5 | — | — | — | — | 125 | — | 950,000 | 28 |
| 35 | 76.3 | — | — | 20 | — | — | — | 3.5 | — | — | — | — | 115 | — | 1,000,000 | 30 |
| 36 | 61.3 | — | — | 35 | — | — | — | 3.5 | — | — | — | — | 95 | — | 1,050,000 | 34 |
| 37 | 46.3 | — | — | 50 | — | — | — | 3.5 | — | — | — | — | 85 | — | 1,050,000 | 43 |
| 38 | 11.3 | 20 | — | 70 | — | — | — | 3.5 | — | — | — | — | 70 | — | 1,080,000 | 32 |
| 39 | 16.3 | — | — | 80 | — | — | — | 3.5 | — | — | — | — | 60 | — | 1,100,000 | 34 |
| 40 | 41.3 | — | 20 | 35 | — | — | — | 3.5 | — | — | — | — | 90 | — | 1,150,000 | 36 |
| 41 | 59.8 | — | — | 35 | — | — | — | 5 | — | — | — | — | 95 | — | 1,050,000 | 35 |
| 42 | 62.7 | — | — | 30 | — | — | — | 7 | — | — | — | — | 95 | — | 1,100,000 | 33 |
| 43 | 59.7 | — | — | 30 | — | — | — | 10 | — | — | — | — | 100 | — | 1,170,000 | 39 |
| 44 | 58.8 | — | — | — | 40 | — | — | — | 1 | — | — | — | 120 | — | 1,150,000 | 36 |
| 45 | 59.3 | — | — | — | — | 50 | — | — | 0.5 | — | — | — | 120 | — | 1,010,000 | 29 |
| 46 | 41.3 | — | 20 | 35 | — | — | — | 3.5 | — | — | — | — | 65 | — | 1,500,000 | 50 |
| 47 | 61.8 | — | — | — | 30 | — | 10 | 3.5 | — | — | — | — | 140 | — | 800,000 | 20 |
| 48 | 59.4 | — | — | 19 | 18 | — | — | 3.5 | — | — | — | — | 100 | — | 1,170,000 | 39 |
| 49 | 6.3 | — | — | 90 | — | — | — | 3.5 | — | — | — | — | 60 | — | 1,050,000 | 32 |
| 50 | 88.3 | — | — | 8 | — | — | — | 3.5 | — | — | — | — | 130 | — | 1,250,000 | 41 |
| 51 | 96.3 | — | — | — | — | — | — | 3.5 | — | — | — | — | 130 | — | 1,200,000 | 37 |

TABLE 1-continued

| Prepara-tion Example | Monomer | | | | | | | | | | | | Reaction solvent | | Molecular weight | |
|---|---|---|---|---|---|---|---|---|---|---|---|---|---|---|---|---|
| | Component a | | | Component b | | | | Component c | | Component d | | | | | |
| | BA | 2EHA | MEA | BZA | PHEA | PDEGA | PHA | 2HEA | 4HBA | AA | MAA | DM | Ethyl acetate | Toluene | Mw | Mw/Mn |
| 52 | 69.5 | — | — | 30 | — | — | — | 0.3 | — | — | — | — | 95 | — | 1,140,000 | 37 |
| 53 | 57.7 | — | — | 30 | — | — | — | 12 | — | — | — | — | 100 | — | 1,300,000 | 38 |
| 54 | 61.3 | — | — | 35 | — | — | — | 3.5 | — | — | — | — | 130 | 30 | 900,000 | 7 |
| 55 | 61.3 | — | — | 35 | — | — | — | 3.5 | — | — | — | — | 100 | 30 | 700,000 | 14 |
| 56 | 61.3 | — | — | 35 | — | — | — | 3.5 | — | — | — | — | 60 | — | 1,540,000 | 55 |
| 57 | 58.3 | — | — | 10 | — | — | — | — | 1 | — | — | — | 70 | — | 1,700,000 | 12 |

Meanings of the abbreviations in Table 1 are as follows.
BA: butyl acrylate
2EHA: 2-ethylhexyl acrylate
MEA: 2-methoxyethyl acrylate
BZA: benzyl acrylate
PHEA: 2-phenoxyethyl acrylate
PHDEGA: phenoxydiethylene glycol acrylate
PHA: phenyl acrylate
2HEA: 2-hydroxyethyl acrylate
4HBA: 4-hydroxybutyl acrylate
AA: acrylic acid
MAA: methacrylic acid
DM: dimethylaminoethyl methacrylate

TABLE 2

| | | Amount added | | | | | | | |
|---|---|---|---|---|---|---|---|---|---|
| | | Polymer | | Curing agent | | Silane Coupling Agent | | Crosslinking accelerator | |
| | | | | | | KBE-9007 | KBM-573 | U-CAT | | |
| | | Prep. Ex. No. | Content (part(s)) | TD-75 (part(s)) | D-94 (part(s)) | (part(s)) | (part(s)) | DBTDL (part(s)) | SA1 (part(s)) | Kaolyzer (part(s)) |
| Example 1 | | 1 | 100 | 0.2 | — | 0.1 | — | — | — | — |
| 2 | | 2 | 100 | 0.2 | — | 0.1 | — | — | — | — |
| 3 | | 3 | 100 | 0.2 | — | 0.1 | — | — | — | — |
| 4 | | 4 | 100 | 0.2 | — | 0.1 | — | — | — | — |
| 5 | | 5 | 100 | — | 0.25 | 0.1 | — | — | — | — |
| 6 | | 6 | 100 | 0.2 | — | 0.1 | — | — | — | — |
| 7 | | 7 | 100 | 0.2 | — | 0.1 | — | — | — | — |
| 8 | | 8 | 100 | 0.18 | — | 0.1 | — | — | — | — |
| 9 | | 9 | 100 | 0.15 | — | 0.1 | — | — | — | — |
| 10 | | 10 | 100 | 0.12 | — | 0.1 | — | — | — | — |
| 11 | | 11 | 100 | 0.2 | — | 0.1 | — | — | — | — |
| 12 | | 12 | 100 | 0.25 | — | 0.1 | — | — | — | — |
| 13 | | 13 | 100 | 0.2 | — | 0.1 | — | — | — | — |
| 14 | | 14 | 100 | 0.18 | — | 0.1 | — | — | — | — |
| 15 | | 15 | 100 | 0.2 | — | 0.1 | — | — | — | — |
| 16 | | 16 | 100 | 0.2 | — | 0.1 | — | — | — | — |
| 17 | | 17 | 100 | 0.2 | — | 0.1 | — | — | — | — |
| 18 | | 18 | 100 | 0.2 | — | 0.1 | — | — | — | — |
| 19 | | 19 | 100 | 0.2 | — | 0.1 | — | — | — | — |
| 20 | | 20 | 100 | 0.2 | — | 0.1 | — | — | — | — |
| 21 | | 7 | 100 | 0.2 | — | — | 0.1 | — | — | — |
| 22 | | 7 | 100 | 0.2 | — | 0.5 | — | — | — | — |
| 23 | | 7 | 100 | 0.2 | — | 0.05 | — | — | — | — |
| 24 | | 21 | 100 | 0.2 | — | 0.1 | — | — | — | — |
| 25 | | 11 | 100 | 0.2 | — | 0.1 | — | 0.003 | — | — |
| 26 | | 34 | 100 | 0.2 | — | 0.1 | — | 0.003 | — | — |
| 27 | | 35 | 100 | 0.2 | — | 0.1 | — | 0.003 | — | — |
| 28 | | 36 | 100 | 0.2 | — | 0.1 | — | 0.003 | — | — |
| 29 | | 37 | 100 | 0.2 | — | 0.1 | — | 0.003 | — | — |
| 30 | | 38 | 100 | — | 0.25 | 0.1 | — | 0.003 | — | — |
| 31 | | 39 | 100 | 0.2 | — | 0.1 | — | 0.003 | — | — |
| 32 | | 40 | 100 | 0.2 | — | 0.1 | — | 0.003 | — | — |
| 33 | | 41 | 100 | 0.18 | — | 0.1 | — | 0.003 | — | — |
| 34 | | 42 | 100 | 0.15 | — | 0.1 | — | 0.003 | — | — |
| 35 | | 43 | 100 | 0.12 | — | 0.1 | — | 0.003 | — | — |
| 36 | | 44 | 100 | 0.2 | — | 0.1 | — | 0.003 | — | — |
| 37 | | 45 | 100 | 0.25 | — | 0.1 | — | 0.003 | — | — |
| 38 | | 46 | 100 | 0.2 | — | 0.1 | — | 0.003 | — | — |
| 39 | | 47 | 100 | 0.2 | — | 0.1 | — | 0.003 | — | — |

TABLE 2-continued

|  |  |  |  |  |  |  |  |  |  |  |
|---|---|---|---|---|---|---|---|---|---|---|
|  | 40 | 48 | 100 | 0.2 | — | 0.1 | — | 0.003 | — | — |
|  | 41 | 40 | 100 | 0.2 | — | — | 0.1 | 0.003 | — | — |
|  | 42 | 40 | 100 | 0.2 | — | 1 | — | 0.003 | — | — |
|  | 43 | 40 | 100 | 0.2 | — | 0.05 | — | 0.003 | — | — |
|  | 44 | 40 | 100 | 0.2 | — | 0.1 | — | 0.001 | — | — |
|  | 45 | 40 | 100 | 0.2 | — | 0.1 | — | — | 0.5 | — |
|  | 46 | 40 | 100 | 0.2 | — | 0.1 | — | — | — | 0.1 |
|  | 47 | 40 | 100 | 0.2 | — | 0.6 | — | 0.003 | — | — |
| Comparative Example | 1 | 22 | 100 | 0.2 | — | 0.1 | — | — | — | — |
|  | 2 | 23 | 100 | 0.2 | — | 0.1 | — | — | — | — |
|  | 3 | 24 | 100 | 0.2 | — | 0.1 | — | — | — | — |
|  | 4 | 25 | 100 | 0.2 | — | 0.1 | — | — | — | — |
|  | 5 | 26 | 100 | 1 | — | 0.1 | — | — | — | — |
|  | 6 | 27 | 100 | 0.2 | — | 0.1 | — | — | — | — |
|  | 7 | 28 | 100 | 0.2 | — | 0.1 | — | — | — | — |
|  | 8 | 29 | 100 | 0.2 | — | 0.1 | — | — | — | — |
|  | 9 | 30 | 100 | 0.2 | — | 0.1 | — | — | — | — |
|  | 10 | 31 | 100 | 0.2 | — | 0.1 | — | — | — | — |
|  | 11 | 32 | 100 | 0.2 | — | 0.1 | — | — | — | — |
|  | 12 | 33 | 100 | 0.2 | — | 0.1 | — | — | — | — |
|  | 13 | 7 | 100 | 0.2 | — | 1 | — | — | — | — |
|  | 14 | 7 | 100 | 0.2 | — | — | — | — | — | — |
|  | 15 | 49 | 100 | 0.2 | — | 0.1 | — | 0.003 | — | — |
|  | 16 | 50 | 100 | 0.2 | — | 0.1 | — | 0.003 | — | — |
|  | 17 | 51 | 100 | 0.2 | — | 0.1 | — | 0.003 | — | — |
|  | 18 | 52 | 100 | 0.2 | — | 0.1 | — | 0.003 | — | — |
|  | 19 | 53 | 100 | 0.2 | — | 0.1 | — | 0.003 | — | — |
|  | 20 | 54 | 100 | 0.2 | — | 0.1 | — | 0.003 | — | — |
|  | 21 | 55 | 100 | 0.2 | — | 0.1 | — | 0.003 | — | — |
|  | 22 | 56 | 100 | 0.2 | — | 0.1 | — | 0.003 | — | — |
|  | 23 | 57 | 100 | 0.2 | — | 0.1 | — | 0.003 | — | — |
|  | 24 | 33 | 100 | 0.2 | — | 0.1 | — | 0.003 | — | — |
|  | 25 | 40 | 100 | 0.2 | — | 1.2 | — | 0.003 | — | — |
|  | 26 | 40 | 100 | 0.2 | — | — | — | 0.003 | — | — |
|  | 27 | 40 | 100 | 0.2 | — | 0.1 | — | — | — | — |
|  | 28 | 40 | 100 | 0.2 | — | 0.1 | — | — | 0.7 | — |

|  |  | Durability | | | Rework property | Light leakage prevention property | | |
|---|---|---|---|---|---|---|---|---|
|  |  | Heat Durability | Moisture and heat durability | Heat cycle durability |  | 8 inch | 15 inch | 20 inch |
| Example | 1 | AA | AA | AA | AA | BB | CC | CC |
|  | 2 | AA | AA | AA | AA | AA | BB | CC |
|  | 3 | AA | AA | AA | AA | AA | AA | BB |
|  | 4 | AA | AA | AA | AA | AA | AA | AA |
|  | 5 | AA | AA | AA | AA | AA | AA | AA |
|  | 6 | AA | AA | AA | BB | AA | AA | AA |
|  | 7 | AA | AA | AA | AA | AA | AA | BB |
|  | 8 | AA | AA | AA | AA | AA | AA | BB |
|  | 9 | AA | AA | AA | AA | AA | AA | BB |
|  | 10 | AA | BB | AA | AA | AA | AA | BB |
|  | 11 | AA | BB | AA | AA | AA | AA | BB |
|  | 12 | AA | AA | AA | AA | AA | AA | BB |
|  | 13 | AA | AA | AA | AA | AA | AA | AA |
|  | 14 | AA | AA | AA | AA | AA | AA | BB |
|  | 15 | AA | AA | AA | AA | AA | AA | BB |
|  | 16 | AA | BB | AA | AA | AA | AA | BB |
|  | 17 | AA | AA | AA | AA | AA | AA | BB |
|  | 18 | AA | BB | AA | AA | AA | AA | AA |
|  | 19 | AA | AA | AA | AA | AA | AA | AA |
|  | 20 | AA | AA | AA | AA | AA | AA | AA |
|  | 21 | AA | AA | AA | AA | AA | AA | BB |
|  | 22 | AA | AA | AA | BB | AA | AA | BB |
|  | 23 | AA | BB | AA | AA | AA | AA | BB |
|  | 24 | AA | AA | AA | AA | AA | AA | BB |
|  | 25 | AA | AA | AA | AA | AA | AA | BB |
|  | 26 | AA | AA | AA | AA | BB | CC | CC |
|  | 27 | AA | AA | AA | AA | AA | BB | CC |
|  | 28 | AA | AA | AA | AA | AA | AA | BB |
|  | 29 | AA | AA | AA | AA | AA | AA | AA |
|  | 30 | AA | AA | AA | AA | AA | AA | AA |
|  | 31 | AA | AA | AA | BB | AA | AA | AA |
|  | 32 | AA | AA | AA | AA | AA | AA | BB |
|  | 33 | AA | AA | AA | AA | AA | AA | BB |
|  | 34 | AA | AA | AA | AA | AA | AA | BB |
|  | 35 | AA | BB | AA | AA | AA | AA | BB |

TABLE 2-continued

|  | | | | | | | | |
|---|---|---|---|---|---|---|---|---|
|  | 36 | AA | AA | AA | AA | AA | AA | BB |
|  | 37 | AA | BB | AA | AA | AA | AA | AA |
|  | 38 | AA | AA | AA | AA | AA | AA | BB |
|  | 39 | AA | BB | AA | AA | AA | AA | AA |
|  | 40 | AA | AA | AA | AA | AA | AA | AA |
|  | 41 | AA | AA | AA | AA | AA | AA | BB |
|  | 42 | AA | AA | AA | BB | AA | AA | BB |
|  | 43 | AA | BB | AA | AA | AA | AA | BB |
|  | 44 | AA | BB | AA | AA | AA | AA | AA |
|  | 45 | AA | AA | AA | AA | AA | AA | BB |
|  | 46 | AA | AA | AA | AA | AA | AA | BB |
|  | 47 | AA | AA | AA | AA | AA | AA | BB |
| Comparative Example | 1 | AA | AA | AA | CC | AA | AA | AA |
|  | 2 | AA | AA | AA | AA | CC | DD | DD |
|  | 3 | AA | AA | AA | AA | DD | DD | DD |
|  | 4 | BB | CC | CC | AA | AA | AA | AA |
|  | 5 | AA | CC | AA | AA | AA | AA | BB |
|  | 6 | BB | CC | CC | AA | AA | AA | AA |
|  | 7 | AA | AA | AA | AA | AA | BB | DD |
|  | 8 | AA | BB | AA | AA | BB | CC | DD |
|  | 9 | BB | CC | CC | AA | AA | BB | BB |
|  | 10 | AA | CC | BB | AA | AA | AA | BB |
|  | 11 | AA | AA | AA | AA | CC | DD | DD |
|  | 12 | AA | AA | AA | AA | BB | CC | DD |
|  | 13 | BB | AA | BB | CC | AA | AA | BB |
|  | 14 | AA | CC | BB | AA | AA | AA | BB |
|  | 15 | AA | AA | AA | CC | AA | AA | AA |
|  | 16 | AA | AA | AA | AA | CC | DD | DD |
|  | 17 | AA | AA | AA | AA | DD | DD | DD |
|  | 18 | BB | CC | CC | AA | AA | AA | AA |
|  | 19 | AA | CC | AA | AA | AA | AA | BB |
|  | 20 | AA | BB | AA | AA | BB | CC | DD |
|  | 21 | BB | CC | CC | AA | AA | BB | BB |
|  | 22 | BB | CC | AA | AA | AA | AA | BB |
|  | 23 | AA | AA | AA | AA | CC | DD | DD |
|  | 24 | AA | AA | AA | AA | BB | CC | DD |
|  | 25 | BB | BB | BB | CC | AA | AA | BB |
|  | 26 | AA | CC | BB | AA | AA | AA | BB |
|  | 27 | BB | CC | BB | BB | AA | AA | AA |
|  | 28 | BB | BB | BB | CC | AA | BB | CC |

Names of the component (B), the component (C) and the component (D) in Table 2 are as follows.
TD-75: isocyanate-based crosslinking agent, available from Soken Chemical & Engineering Co., Ltd.
D-94: isocyanate-based crosslinking agent, available from Soken Chemical & Engineering Co., Ltd.
KBE-9007: isocyanate-based silane coupling agent, available from Shin-Etsu Chemical Co., Ltd.
KBM-573: amino-based silane coupling agent, available from Shin-Etsu Chemical Co., Ltd.
DBTDL: dibutyltin laurate, available from Tokyo Chemical Industry Co., Ltd.

As is clear from the evaluation results set forth in Table 2, the adhesive sheets using the adhesives of the invention were free from occurrence of foaming and peeling and were excellent in durability and rework property. Further, it is also indicated that the adhesives of the invention were excellent also in light leakage prevention property in each size. On the other hand, the adhesive sheets of the comparative examples had a defect in any one of durability, rework property and light leakage prevention property.

According to the present invention, an adhesive composition which is free from bleeding of a low-molecular weight component, can inhibit contamination in the re-release process and peeling under severe conditions and is excellent also in rework property with reconciling durability with light leakage prevention property can be provided. Therefore, the adhesive composition can be applied to various uses, for example, adhesive sheets for optical films such as polarizing films and retardation films.

The invention claimed is:

1. An adhesive composition for optical films, comprising the following components (A-1), (B) and (C):
   (A-1) an acrylic-based polymer obtained by copolymerizing at least the following monomer components (a1), (a2), (a3) and (a4) and having a weight-average molecular weight of 800,000 to 1,600,000 and a value (Mw/Mn), as obtained by dividing the weight-average molecular weight of the copolymer by the number-average molecular weight thereof, of 10 to 50,
   (a1) a (meth)acrylic acid alkyl ester and/or a (meth)acrylic acid alkoxyalkyl ester in an amount of 4.5 to 89% by weight,
   (a2) an aromatic ring-containing monomer in an amount of 10 to 85% by weight,
   (a3) a hydroxyl group-containing monomer in an amount of 0.5 to 10% by weight, and
   (a4) a carboxyl group- or amino group-containing monomer in an amount of 0.05 to 0.5% by weight,
   (B) an isocyanate-based crosslinking agent in an amount of 0.005 to 5 parts by weight based on 100 parts by weight of the acrylic-based polymer, and
   (C) a silane coupling agent in an amount of 0.05 to 1.0 part by weight based on 100 parts by weight of the acrylic-based polymer.

2. The adhesive composition for optical films as claimed in claim 1, wherein the component (a2) is at least one monomer selected from phenyl acrylate, phenoxyethyl (meth)acrylate, benzyl (meth)acrylate, phenoxydiethylene glycol (meth) acrylate, ethylene oxide-modified nonylphenol (meth)acrylate, hydroxyethylated β-naphthol acrylate, biphenyl (meth) acrylate, styrene, vinyltoluene and α-methylstyrene.

3. The adhesive composition for optical films as claimed in claim 1, further comprising a crosslinking accelerator as a component (D).

4. An adhesive sheet having, on at least one surface of a substrate, an adhesive layer obtained from the adhesive composition of claim 1.

5. An optical member having, on at least one surface of an optical film, an adhesive layer obtained from the adhesive composition of claim 1.

6. An adhesive composition for optical films, comprising the following components (A-2), (B), (C) and (D):
   (A-2) an acrylic-based polymer obtained by copolymerizing at least the following components (a1), (a2) and (a3) and having a weight-average molecular weight of 800,000 to 1,600,000 and a value (Mw/Mn), as obtained by dividing the weight-average molecular weight of the copolymer by the number-average molecular weight thereof, of 10 to 50,
   (a1) a (meth)acrylic acid alkyl ester and/or a (meth)acrylic acid alkoxyalkyl ester in an amount of 5 to 89.5% by weight,
   (a2) an aromatic ring-containing monomer in an amount of 10 to 85% by weight, and
   (a3) a hydroxyl group-containing monomer in an amount of 0.5 to 10% by weight,
   (B) an isocyanate-based crosslinking agent in an amount of 0.005 to 5 parts by weight based on 100 parts by weight of the acrylic-based polymer,
   (C) a silane coupling agent in an amount of 0.05 to 1.0 part by weight based on 100 parts by weight of the acrylic-based polymer, and
   (D) a crosslinking accelerator in an amount of 0.001 to 0.5 part by weight based on 100 parts by weight of the acrylic-based polymer.

7. The adhesive composition for optical films as claimed in claim 6, wherein the component (a2) is at least one monomer selected from phenyl acrylate, phenoxyethyl (meth)acrylate, benzyl (meth)acrylate, phenoxydiethylene glycol (meth)acrylate, ethylene oxide-modified nonylphenol (meth)acrylate, hydroxyethylated β-naphthol acrylate, biphenyl (meth)acrylate, styrene, vinyltoluene and α-methylstyrene.

8. An adhesive sheet having, on at least one surface of a substrate, an adhesive layer obtained from the adhesive composition of claim 6.

9. An optical member having, on at least one surface of an optical film, an adhesive layer obtained from the adhesive composition of claim 6.

10. The adhesive composition for optical films as claimed in claim 2, further comprising a crosslinking accelerator as a component (D).

11. An adhesive sheet having, on at least one surface of a substrate, an adhesive layer obtained from the adhesive composition of claim 2.

12. An adhesive sheet having, on at least one surface of a substrate, an adhesive layer obtained from the adhesive composition of claim 3.

13. An optical member having, on at least one surface of an optical film, an adhesive layer obtained from the adhesive composition of claim 2.

14. An optical member having, on at least one surface of an optical film, an adhesive layer obtained from the adhesive composition of claim 3.

15. An adhesive sheet having, on at least one surface of a substrate, an adhesive layer obtained from the adhesive composition of claim 7.

* * * * *

UNITED STATES PATENT AND TRADEMARK OFFICE
CERTIFICATE OF CORRECTION

| | |
|---|---|
| PATENT NO. | : 7,825,189 B2 |
| APPLICATION NO. | : 12/094294 |
| DATED | : November 2, 2010 |
| INVENTOR(S) | : Tomita et al. |

Page 1 of 1

It is certified that error appears in the above-identified patent and that said Letters Patent is hereby corrected as shown below:

Columns 17 and 18, TABLE 2-continued, Comparative Example No. 13, in the 5th column, "1" should read -- 1.2 --.

Signed and Sealed this
Eighth Day of March, 2011

David J. Kappos
*Director of the United States Patent and Trademark Office*